United States Patent
Miyazaki

(10) Patent No.: US 6,707,483 B2
(45) Date of Patent: Mar. 16, 2004

(54) OPTICAL PRINTER HAVING A VIBRATION DETECTOR

(75) Inventor: Takao Miyazaki, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 8 days.

(21) Appl. No.: 09/977,230

(22) Filed: Oct. 16, 2001

(65) Prior Publication Data

US 2002/0044198 A1 Apr. 18, 2002

(30) Foreign Application Priority Data

Oct. 16, 2000 (JP) ........................................ 2000-315311

(51) Int. Cl.⁷ ............................................... B41J 2/435
(52) U.S. Cl. ........................................ 347/248; 347/234
(58) Field of Search ................................ 347/234, 248, 347/23, 238, 237; 400/54; 369/44.32

(56) References Cited

U.S. PATENT DOCUMENTS 4,600,319 A * 7/1986 Everett, Jr. ................. 400/54
5,315,569 A * 5/1994 Saito et al. ............... 369/44.32

FOREIGN PATENT DOCUMENTS

| EP | 1 026 543 A1 | * 9/2000 | ............ G03B/17/52 |
|---|---|---|---|
| JP | 3-74973 | * 3/1991 | ............ H04N/5/225 |
| JP | 5-19558 | * 1/1993 | ............ G03G/15/00 |
| JP | 11-252491 | 2/1998 | ............ H04N/5/78 |

* cited by examiner

Primary Examiner—Hai Pham
(74) Attorney, Agent, or Firm—Sughrue Mion, PLLC

(57) ABSTRACT

An electronic still camera with a printer includes a vibration detector and a system controller. The vibration detector detects vibration relative to a moving direction of an exposure head of the printer. When the vibration detector detects the vibration exceeding a prescribed level, the system controller interrupts a printing operation of the printer. After that, when the vibration detector detects the vibration falling below the prescribed level, the system controller resumes the printing operation. The exposure head is adapted to be moved, performing the printing operation one line by one line. Until the printing operation for one line is completed, the system controller suspends to interrupt the printing operation.

18 Claims, 7 Drawing Sheets

OPTICAL PRINTER HAVING A VIBRATION DETECTOR

BACKGROUND OF THE INVENTION

1. Field of the Invention

The present invention relates to an optical printer having a vibration detector, and more particularly to an optical printer to be used in a portable electronic still camera and so forth.

2. Description of the Related Art

As to an optical printer, it is known that printing is performed with a print head scanning a recording paper. Meanwhile, an electronic still camera with a printer is known. Such an electronic still camera has a built-in optical printer superior in portability, as disclosed in Japanese Patent Laid-Open Publication No. 11-252491. A print head of an exposure type is provided with a red-light emitting portion which has a line shape so as to extend in a main-scanning direction. A green-light emitting portion and a blue-light emitting portion respectively having a line shape are arranged in a sub-scanning direction of the red-light emitting portion. Line-shaped recording light, intensity of which is modulated based on image data, is generated relative to each color of red, green and blue. After exposure of one line has been completed, the print head is moved by one line in the sub-scanning direction in order to expose the next line.

The above-mentioned optical printer, however, has a shortcoming that unevenness of print occurs due to a swing of the print head. The swing of the print head is caused by vibration applied at the time of printing. Especially, in case the vibration is applied in a sub-scanning direction which is a moving direction of the print head, exposure portions of the respective colors are shifted. Hence, the unevenness of print is likely to be caused. This phenomenon remarkably appears in a portable apparatus, for example, in an electronic still camera with a printer, since such an apparatus is frequently carried with a user. In the optical printer, exposure is performed in a state that the print head does not contact with a film surface. Sometimes the print head contacts with the film surface due to the vibration so that the film surface is likely to be damaged.

SUMMARY OF THE INVENTION

In view of the foregoing, it is a primary object of the present invention to provide an optical printer in which unevenness of print is prevented from being caused due to vibration.

It is a second object of the present invention to provide an optical printer in which printing is easily performed without an extra operation.

In order to achieve the above and other objects, the optical printer according to the present invention comprises a vibration detector and a print controller. When the vibration detector detects the vibration exceeding a prescribed level, the print controller interrupts a printing operation of the printer.

In a preferred embodiment, a print head is adapted to be moved, performing the printing operation one line by one line. Even if the vibration detector detects the vibration exceeding the prescribed level, the print controller suspends to interrupt the printing operation until completion of one-line printing.

After interrupting the printing operation, the print controller resumes the printing operation when the vibration detector detects the vibration falling below the prescribed level.

It is preferable that the vibration detector detects the vibration relative to a moving direction of the print head.

According to the present invention, unevenness of print may be prevented from occurring under a condition that the vibration is applied during the printing operation. In addition, the printing operation is automatically resumed after interruption thereof. Thus, once an instruction for printing is given, it is unnecessary to give the instruction for printing again. The printing operation may be easily performed without an extra instruction.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
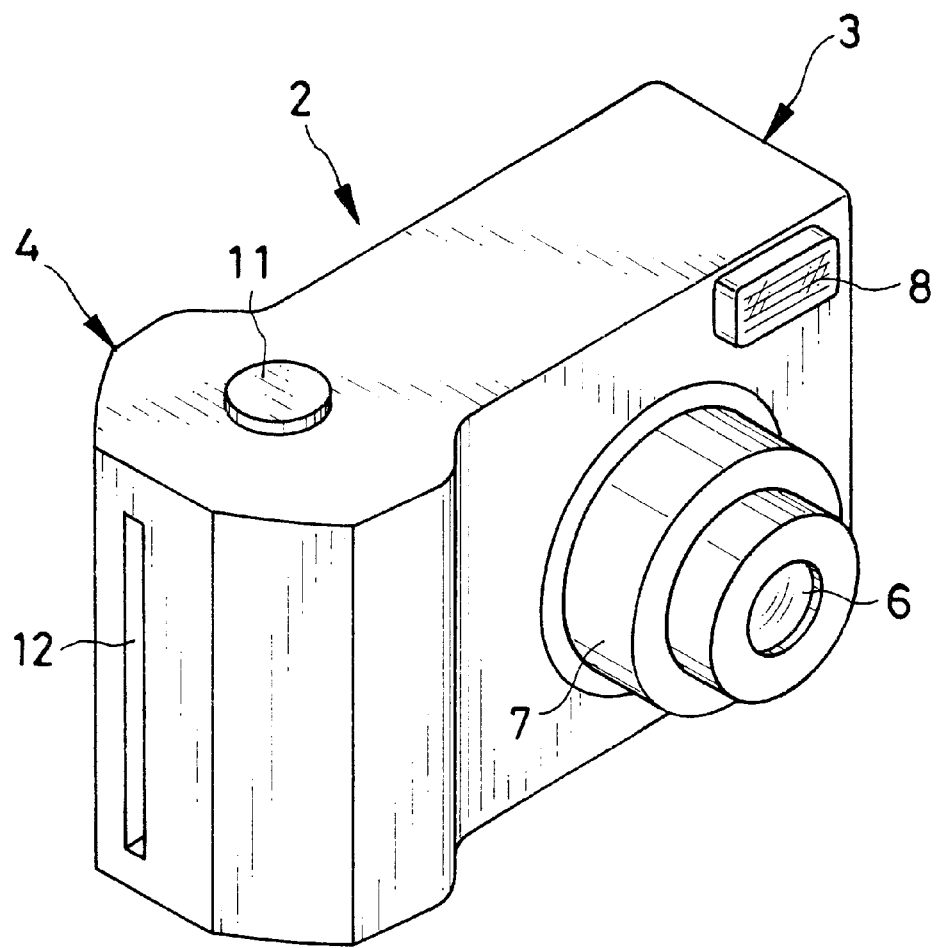
FIG. 1 is a perspective view showing an electronic still camera with a printer according to the present invention.
Figure 2:
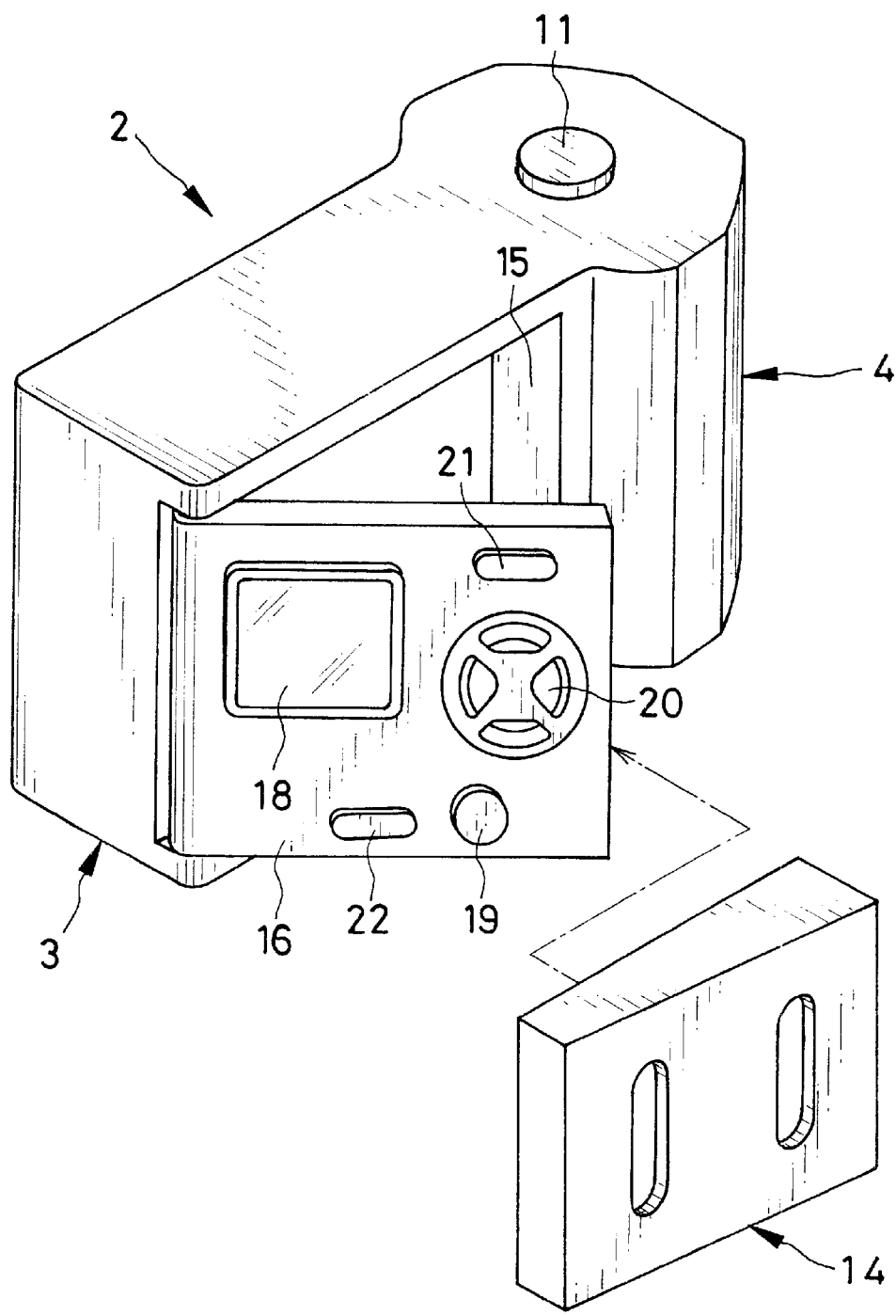
FIG. 2 is a perspective view showing a rear side of the electronic still camera.

FIGS. 1 and 2 respectively show a front side and a rear side of an electronic still camera having a built-in optical printer according to the present invention. The electronic still camera 2 comprises a main body 3 and a grip 4. The main body 3 has a parallelepiped shape. The grip 4 is integrally formed on the side of the main body 3 and has a cylindrical shape.

A front central portion of the main body 3 is provided with a lens barrel 7 so as to protrude forward. A taking lens 6 is contained in the lens barrel 7. A flash unit 8 is provided above the lens barrel 7. An upper face of the grip 4 is provided with a shutter button 11, and a side face thereof is provided with a paper slit 12.

Upon depression of the shutter button 11, a picture is taken through the taking lens 6. When the brightness of a subject is a prescribed level or less, a flash device which is not shown is activated to emit a flash light from the flash unit 8 toward the subject. Successively, an instant film 25 is discharged through the paper slit 12 toward the outside of the electronic still camera 2.

A rear side of the electronic still camera 2 is formed with a chamber 15 for containing a film pack 14. Unexposed instant films 25 are stacked inside the film pack 14 (see FIG. 3). The back of the film-pack containing chamber 15 is provided with a lid 16 so as to be openable. The chamber 15 is light-tightly covered with the lid 16.

The lid 16 is provided with an LCD panel 18 in which liquid-crystal display elements are arranged in matrix. An optical image having passed through the taking lens 6 is converted into an electric image signal in a CCD image sensor 32 (see FIG. 3). Under a photograph mode, based on the obtained image signal, a subject image is displayed on the LCD panel 18 in real time. Meanwhile, under a reproduction mode and a print mode, a still image stored in a memory is displayed on the LCD panel 18.

The lid 16 is also provided with a print button 19, a multi-operation button 20, a power-supply button 21, and an auxiliary button 22. The multi-operation button 20 is used for changing the photograph mode, for zooming, for setting a print number, for selecting a frame at the time of printing, and so forth. Under the print mode, the taken images are displayed on the LCD panel 18 ten by ten. The image to be printed is selected with the multi-operation button 20 and is printed on the instant film 25 upon depression of the print button 19.

Figure 3:
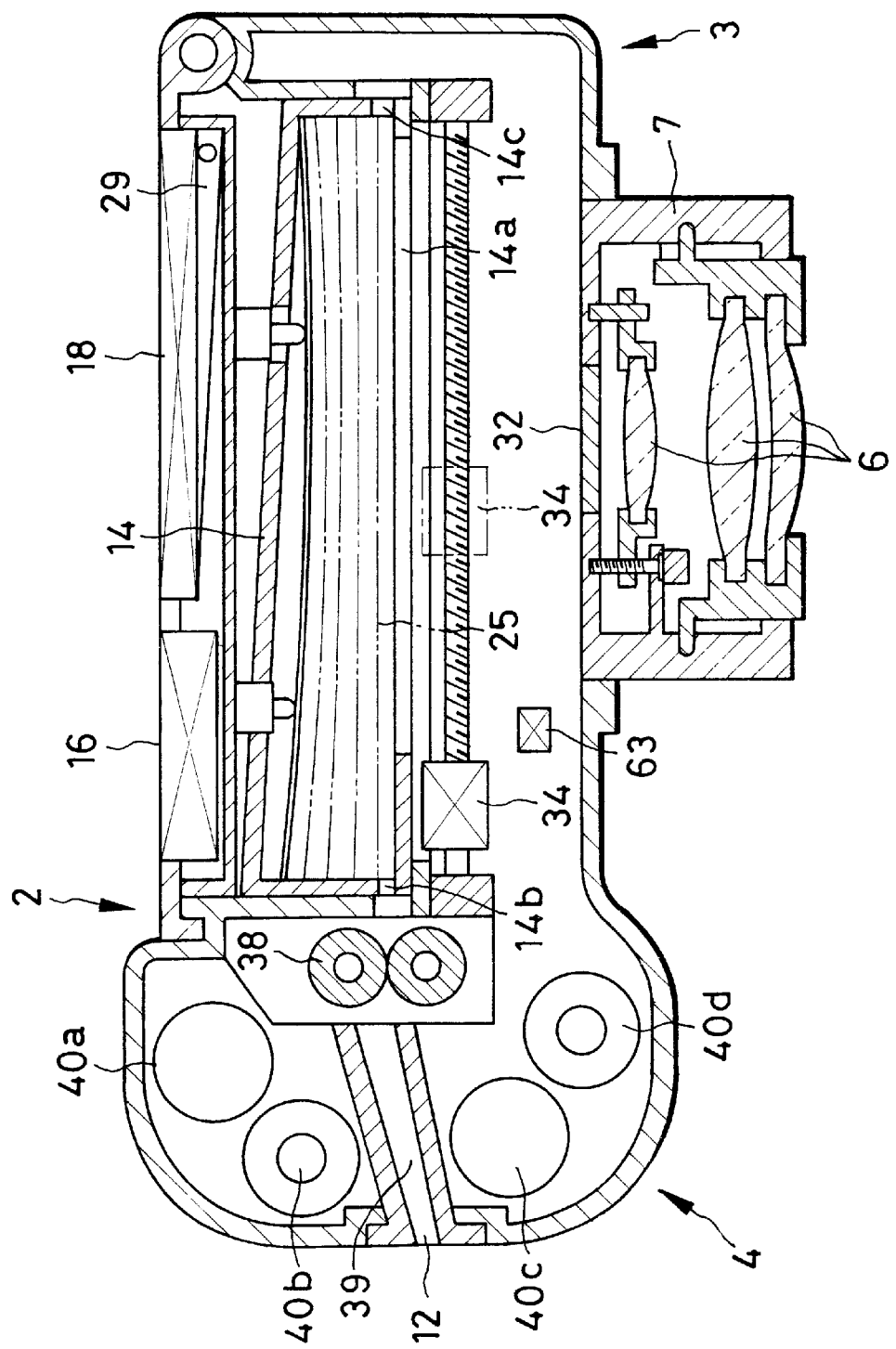
FIG. 3 is a sectional view schematically showing a structure of the electronic still camera.

FIG. 3 is a sectional view of the electronic still camera 2 with the printer. A front side of the film pack 14 is formed with an exposure aperture 14a, a film outlet 14b, and a cutout 14c. The instant film 25 is exposed by the light passing through the exposure aperture 14a. The film outlet 14b is formed for conveying the exposed instant film 25 to the outside. The cutout 14c is formed for engaging with a well-known claw which is not shown. Meanwhile, the film-pack containing chamber 15 is provided with openings formed at positions respectively corresponding to the exposure aperture 14a, the film outlet 14b, and the cutout 14c.

As to the instant film 25, a mono-sheet type is used. The mono-sheet type is well known and is basically constituted of a photosensitive sheet, an image receiving sheet, a pod including developer, and a trap portion for absorbing the redundant developer. After optically forming a latent image by exposing the photosensitive sheet, pressure is applied to both of the photosensitive sheet and the image receiving sheet to spread the developer between these sheets. Owing to this, a positive image is transferred to the image receiving sheet. Incidentally, the LCD panel 18 and a back light 29 are attached to an inner wall of the lid 16. The back light 29 is disposed along a rear face of the film pack 14.

The taking lenses 6 are held in the lens barrel 7, and the CCD image sensor 32 is disposed at an image forming surface of the taking lenses 6. The optical image having passed through the taking lenses 6 is converted into the image signal by means of photoelectric conversion. Then, the image signal is recorded, as image data, in a memory provided inside the camera.

An exposure head 34 is disposed in front of the exposure aperture 14a to perpendicularly emit the light toward an exposure surface of the instant film 25. The exposure head 34 is disposed in a main-scanning direction being crosswise relative to a discharging direction (sub-scanning direction) of the instant film 25. The exposure head 34 comprises a red-light emitting diode, a green-light emitting diode, and a blue-light emitting diode which are arranged in order in the sub-scanning direction. In other words, the exposure head 34 generates line-shaped recording light with respect to each color of red, green and blue. At this time, intensity of the recording light is modulated based on the image data.

Figure 4:
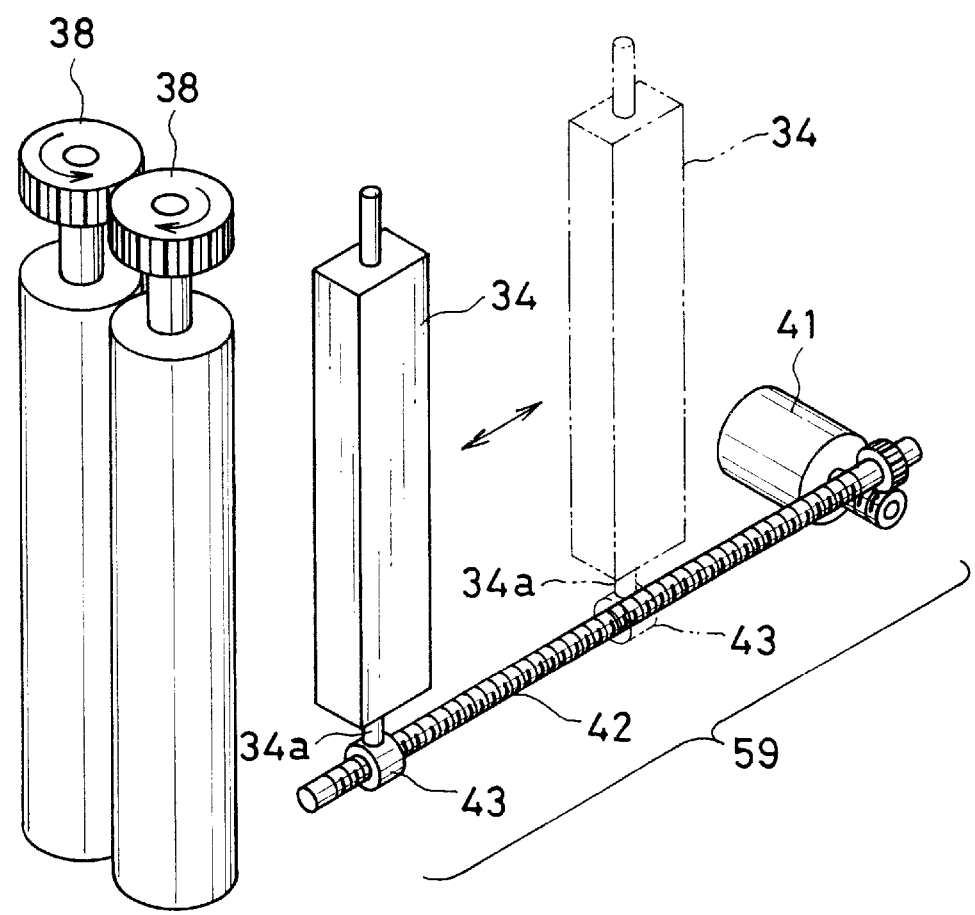
FIG. 4 is a perspective view schematically showing a structure of the printer.

As shown in FIG. 4, the exposure head 34 is driven by a head moving mechanism 59 which is well known. The head moving mechanism 59 comprises a motor 41, a lead screw 42, and a moving member 43. The lead screw 42 is rotated by the motor 41. The moving member 43 is moved in an axial direction of the lead screw 42 (the sub-scanning direction) in accordance with the rotation of the lead screw 42. One shaft 34a of the exposure head 34 is attached to the moving member 43. In virtue of this, the exposure head 34 is moved in the sub-scanning direction when the motor 41 is rotated.

The well-known claw is disposed near the cutout 14c of the film pack 14. The claw is moved to the left in the drawing by receiving a drive force of a motor which is not shown. When the claw enters the cutout 14c, an end edge of the front instant film 25 is pushed by the claw. Consequently, a top edge of the front instant film 25 passes through the film outlet 14b.

A roller pair 38 used for spreading is disposed near the film outlet 14b. The roller pair 38 is rotated by means of a motor 61 (see FIG. 5) which is used for spreading. The top edge of the instant film 25 pushed out of the film-pack containing chamber 15 is caught by the roller pair 38 to be advanced to the paper slit 12. At this time, the pod of the instant film 25 is broken to spread the developer between the photosensitive sheet and the image receiving sheet. The grip 4 is provided with a film passage 39 for guiding the advanced instant film 25 toward the paper slit 12. At both sides of the film passage 39, are disposed batteries 40a to 40d used for driving.

Figure 5:
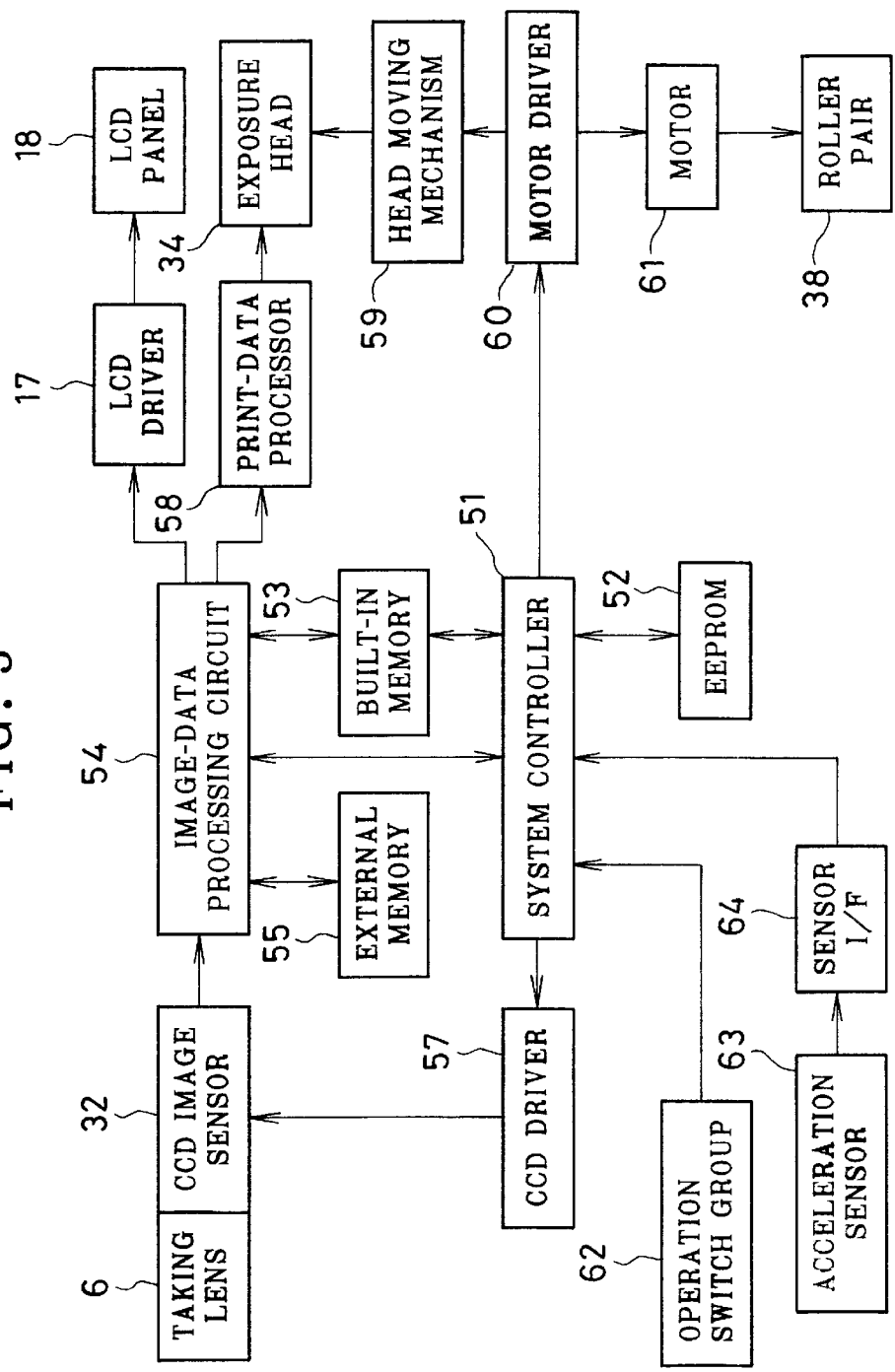
FIG. 5 is a block diagram schematically showing a function of the electronic still camera.

FIG. 5 shows an electrical structure of the electronic still camera 2 with the printer. The still camera 2 is controlled by a system controller 51 transferring data between an EEPROM 52 and a built-in memory 53. In the EEPROM 52, various sequence programs are written. In addition, various correction data and control data are also written.

When the shutter button 11 is operated to take a picture, the built-in memory 53 memorizes the image data of one frame obtained from an image-data processing circuit 54. The image stored in the built-in memory 53 is stored in an external memory 55 as well. The built-in memory 53 has memory capacity so as to be capable of storing the image data corresponding to fifty frames. Thus, it is possible to store enough images only by using the built-in memory without using the external memory 55.

Behind the taking lens 6, the CCD image sensor 32 is disposed. An image of a subject is formed on a photoelectric surface of the CCD image sensor 32 by bringing the taking lens 6 into focus. The CCD image sensor 32 is driven by a CCD driver 57 to convert the optical image of the subject into an electrical image signal. This image signal is outputted to the image-data processing circuit 54. The LCD panel 18 is actuated by the image-data processing circuit 54 through an LCD driver 17.

Upon depression of the print button 19, the image data stored in the built-in memory 53 is inputted into a print-data processor 58 via the image-data processing circuit 54. The print-data processor 58 converts the inputted image data so as to be used for printing, and outputs it to the exposure head 34. Meanwhile, the head moving mechanism 59 is controlled by the system controller 51 via a motor driver 60 to drive the exposure head 34 in synchronism with the print-data processor 58. The motor driver 60 drives not only the head moving mechanism 59 but also the motor 61 for driving the roller pair 38.

The system controller 51 periodically monitors a plurality of signals outputted from an operation switch group 62 and an acceleration sensor 63 being as a vibration detector. The operation switch group 62 includes the shutter button 11, the print button 19, the multi-operation button 20, the power-supply switch 21, the auxiliary button 22, and so forth. For instance, the system controller 51 starts printing the instant film 25 upon depression of the print button 19.

The acceleration sensor 63 is disposed inside the electronic still camera 2, and detects acceleration only in one axial direction. When vibration is applied to the exposure head 34 in a moving direction thereof, a moving speed of the exposure head 34 is changed. Due to this, an exposed portion is shifted so that sometimes unevenness of print is caused. In view of this, the acceleration sensor 63 used in the present embodiment detects the acceleration in the moving direction of the exposure head 34, namely in the sub-scanning direction. The acceleration sensor 63 outputs an electric current value to a sensor I/F 64 in proportion to a level of the detected acceleration. The sensor I/F 64 calculates the level of the acceleration from the electric current value outputted from the acceleration sensor 63. Further, the sensor I/F 64 digitizes the acceleration level and outputs it to the system controller 51.

In case an input from the acceleration sensor 63 becomes a prescribed threshold value $A_{th}$ or more at the time of printing, the system controller 51 interrupts printing to avoid the unevenness of print caused by the vibration. If the input from the acceleration sensor 63 becomes less than the prescribed threshold value $A_{th}$ during the interruption of printing, the system controller 51 resumes printing. In the present embodiment, an analog signal from the acceleration sensor 63 is digitized by the sensor I/F 64. However, when using the acceleration sensor directly outputting a digital signal, the sensor I/F may be omitted.

When the output of the acceleration sensor 63 has already become the prescribed threshold value $A_{th}$ or more at the time of depressing the print button 19, printing is not started. And then, when the output of the acceleration sensor 63 becomes less than the prescribed threshold value $A_{th}$, printing is started. Once the print button 19 is depressed, the depression thereof is memorized until completion of printing. Incidentally, the threshold value $A_{th}$ is set by the program stored in the EEPROM 52 (see FIG. 7).

Figure 6:
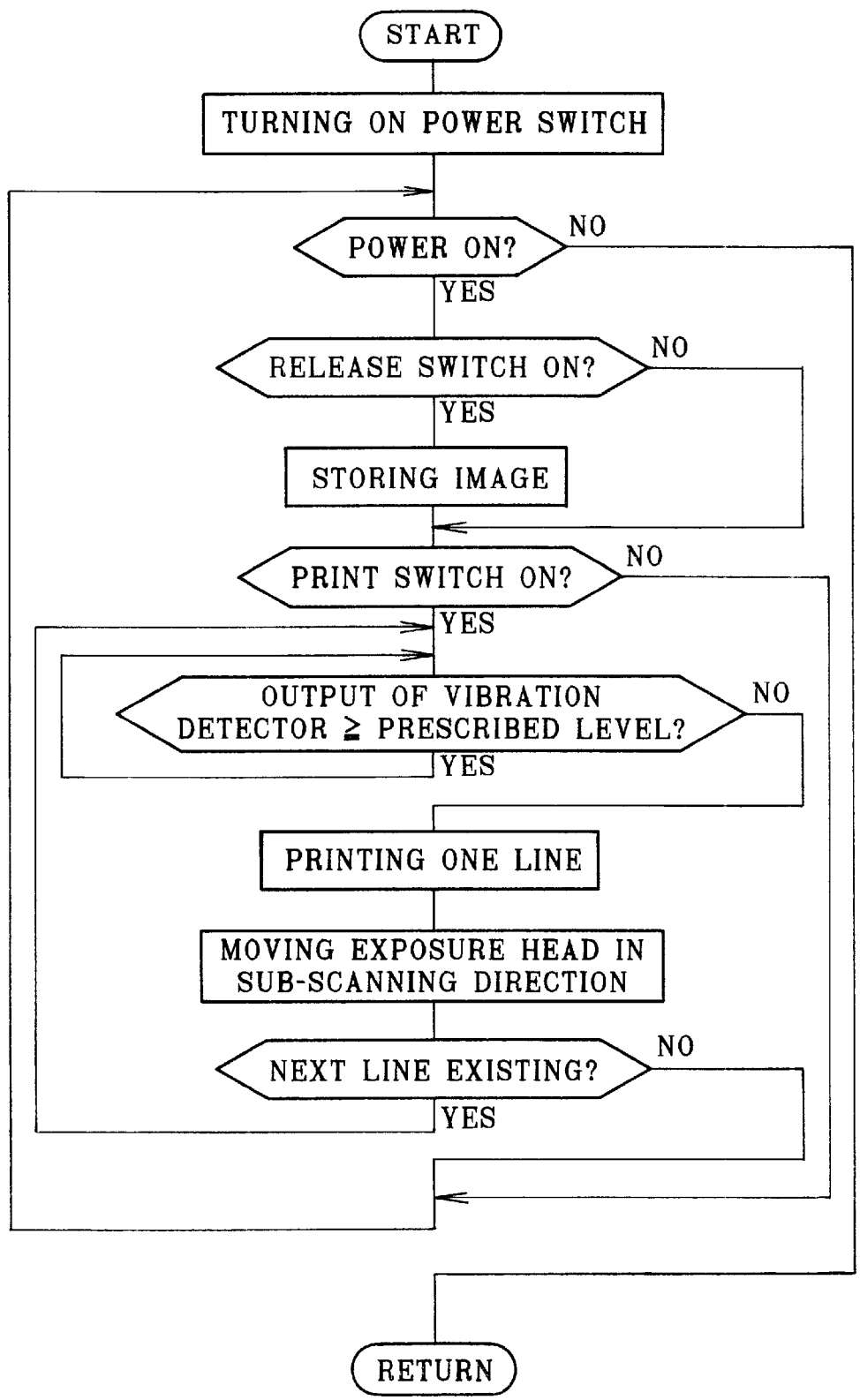
FIG. 6 is a flow chart showing a sequential operation of the electronic still camera.

The electronic still camera 2 with the printer is constructed such as described above, and hereinafter, an operation thereof is described, referring to a flow chart shown in FIG. 6. This drawing partially shows a sequential operation so that a part thereof is omitted. First of all, the power-supply button 21 of the electronic still camera 2 is turned on to electrify each mechanism. Successively, it is confirmed that electric power is supplied, and then, the photograph mode is set. When the power-supply button 21 is turned off, the sequential operation is finished.

While the power-supply button 21 is turned on, the system controller 51 monitors a state of each switch to execute a process instructed through the switch. For example, when the photograph mode is set, it is performed to zoom for the subject and to select the mode upon depression of the multi-operation button 20. Moreover, upon depression of the shutter button 11, an image is taken by the CCD image sensor 32 and is stored in the built-in memory 53.

Figure 7A:
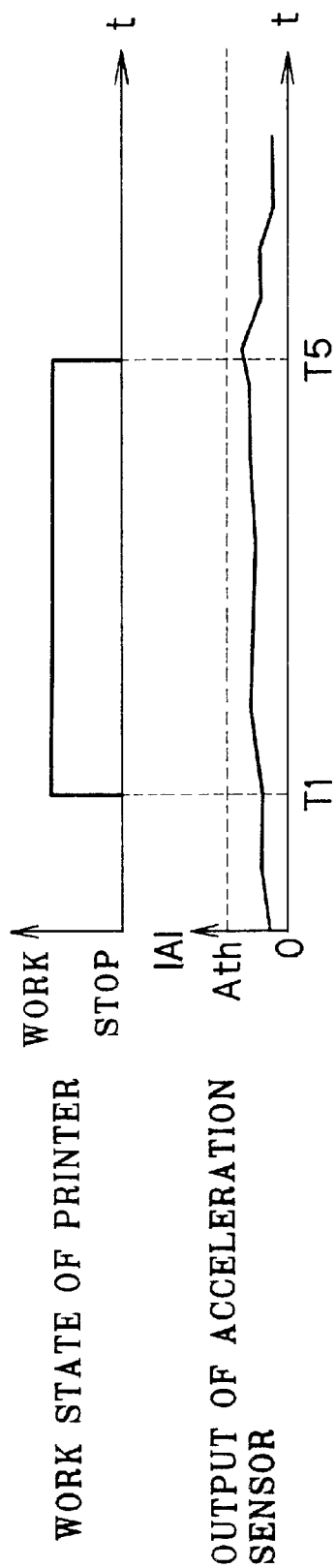
FIGS. 7A and 7B are explanatory illustrations showing a relationship between a work state of the printer and an output of an acceleration sensor.
Figure 7B:
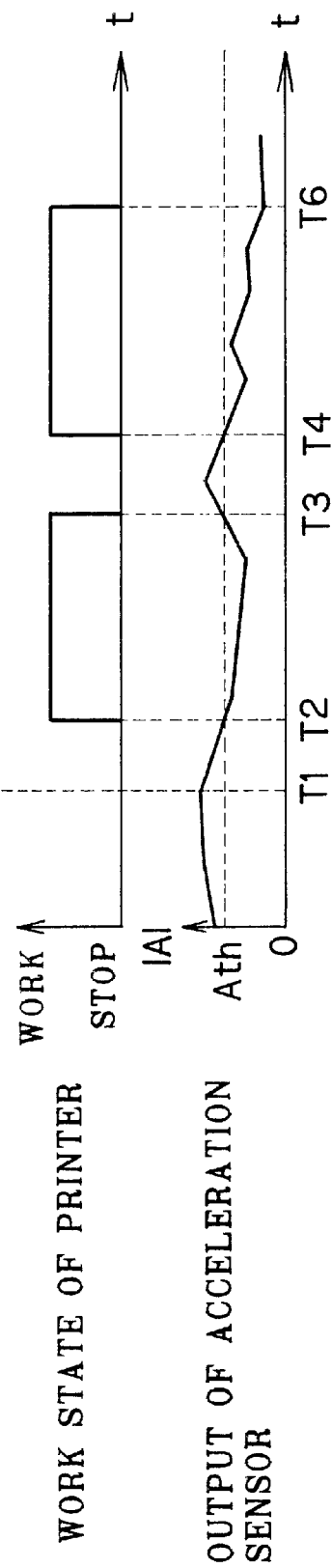

FIG. 7 shows a relationship between a work state of the printer and an output of the acceleration sensor 63. FIG. 7A shows a case in that the vibration exceeding the prescribed threshold value $A_{th}$ has not occurred. FIG. 7B shows another case in that the vibration exceeding the prescribed threshold value $A_{th}$ has occurred. In FIG. 7B, delay of timing is omitted. Such delay of timing is caused due to a sampling cycle when monitoring the output of the acceleration sensor 63. Further, the delay of timing is also caused when the vibration exceeding the threshold value $A_{th}$ occurs during one-line printing. When the print button 19 is depressed after changing the mode to the print mode (T1 in FIG. 7), the system controller 51 confirms whether or not the output of the acceleration sensor 63 is less than the prescribed threshold value $A_{th}$.

As shown in FIG. 7A, when the output of the acceleration sensor 63 is less than the threshold value $A_{th}$ at the timing T1, printing is started. In contrast, as shown in FIG. 7B, when the output of the acceleration sensor 63 is the threshold value $A_{th}$ or more at the timing T1, printing is not started. In this case, the system controller 51 is adapted to periodically monitor the output of the acceleration sensor 63. Printing is not started until the output of the acceleration sensor 63 becomes less than the threshold value $A_{th}$ (T2 in FIG. 7B).

In response to the start of printing, exposure of one line is performed in the scanning direction. Successively, it is confirmed whether the next line to be printed exists or not. When the line to be printed is exists, the exposure head 34 is moved in the sub-scanning direction to expose the next line.

Whenever printing of one line is completed, it is confirmed whether or not the output of the acceleration sensor 63 is less than the threshold value $A_{th}$. As shown in FIG. 7B, when the output of the acceleration sensor 63 becomes the threshold value $A_{th}$ or more (T3 in FIG. 7B), printing is interrupted. Printing is not resumed until the output of the acceleration sensor 63 becomes less than the threshold value $A_{th}$ (T4 in FIG. 7B). Incidentally, even if the output of the acceleration sensor 63 becomes the value $A_{th}$ or more during the print of one line, printing is not interrupted until the current line is printed. In the meantime, as shown in FIG. 7A, while the output of the acceleration sensor 63 is less than the threshold value $A_{th}$, printing is not interrupted.

By repeating the above-described way, printing for the whole lines is completed (T5 in FIG. 7A and T6 in FIG. 7B). Once the print button 19 is depressed, depression thereof is memorized until completion of printing. In virtue of this, printing is not canceled if printing is interrupted halfway due to the vibration exceeding the threshold value $A_{th}$ such as shown in FIG. 7B. Once the print button 19 is depressed, printing is performed to the last.

As described above, the optical printer according to the present invention stops printing when the vibration exceeds a certain prescribed value. Thus, the unevenness of print is prevented from occurring due to the vibration. Moreover, the print head is prevented from contacting with the print surface so that the print surface is not damaged. Further, the optical printer automatically resumes printing when the vibration falls below the prescribed value. Thus, it is not required for a user to give an additional instruction for printing. In other words, it is possible to easily print without an extra operation.

In the above embodiment, the acceleration sensor 63 is used as the vibration detector. However, a speed sensor may be employed. Although the acceleration sensor has a wide measuring range and is easily used, a size thereof is larger than the speed sensor. In addition, the acceleration sensor is expensive. The speed sensor has a narrow measuring range in comparison with the acceleration sensor so that it is difficult to detect rapid vibration and shocks. However, the speed sensor is cheaper than the acceleration sensor so that the speed sensor is sometimes employed in accordance with a product. In this case, similarly to the acceleration sensor 63, the speed sensor monitors the speed of the exposure head 34 in the moving direction thereof. Then, acceleration is calculated from monitored time length and speed difference. When the calculated acceleration becomes the threshold value or more, printing is interrupted. The interrupted printing is resumed when the acceleration becomes less than the threshold value. In the above embodiment, the acceleration sensor of one axis is used. However, the acceleration sensor of two or three axes may be used as the vibration detector.

In the above embodiment, the present invention is applied to the electronic still camera with the printer. The present invention, however, may be applied to a camera with a printer and another printer such as an optical printer. Moreover, in the printer of the forgoing embodiment, the exposure head is driven in the sub-scanning direction. In a case that a printer has an exposure head driven in the scanning direction, the vibration detector may be provided relative to a driving direction of the exposure head.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical printer including a print head which is moved on a parallel with an image forming surface of a photosensitive recording medium and is moved in a first direction, a print operation being performed by emitting a printing light from said print head toward said photosensitive recording medium for recording a visible image, said optical printer comprising:
   a vibration detector for detecting vibration applied to said optical printer; and
   print control means for judging, based on a signal outputted from said vibration detector, whether or not said vibration is a prescribed level or more, said print control means interrupting said print operation when said vibration is said prescribed level or more;
   wherein said photosensitive recording medium is in a stationary state when said visible image is recorded.

2. An optical printer according to claim 1, wherein said print head records one line of said visible image on said photosensitive recording medium in a second direction perpendicular to said first direction, and said print head is moved in said first direction whenever said one line is recorded.

3. An optical printer according to claim 1, wherein said vibration detector detects the vibration applied in said first direction.

4. An optical printer according to claim 1, wherein said vibration detector detects acceleration of said print head.

5. An optical printer according to claim 1, wherein said vibration detector comprises a speed detector.

6. An optical printer according to claim 5, wherein said speed detector detects speed in said first direction.

7. An optical printer including a print head which is moved on a parallel with an image forming surface of a photosensitive recording medium and is moved in a first direction, a print operation being performed by emitting a printing light from said print head toward said photosensitive recording medium, said optical printer comprising:
   a vibration detector for detecting vibration applied to said optical printer; and
   print control means for judging, based on a signal outputted from said vibration detector, whether or not said vibration is a prescribed level or more, said print control means interrupting said print operation when said vibration is said prescribed level or more;
   wherein said print head records one line on said photosensitive recording medium in a second direction perpendicular to said first direction, and said print head is moved in said first direction whenever said one line is recorded;
   wherein said print control means suspends to interrupt said print operation until said print operation of said one line is completed.

8. An optical printer according to claim 7, wherein said print control means monitors said signal of said vibration detector after interruption of said print operation in order to judge whether or not the vibration falls below said prescribed level, and said print control means resumes said print operation when the vibration falls below said prescribed level.

9. An optical printer according to claim 8, wherein said vibration detector detects the vibration applied in said first direction.

10. An optical printer according to claim 9, wherein said vibration detector detects acceleration of said print head.

11. An electronic still camera having a built-in optical printer including a print head which is moved on a parallel with an image forming surface of a photosensitive recording medium and is moved in a first direction, a print operation being performed by emitting a printing light from said print head toward said photosensitive recording medium for recording a visible image, said optical printer comprising:
   a vibration detector for detecting vibration applied to said optical printer; and
   print control means for judging, based on a signal outputted from said vibration detector whether or not said vibration is a prescribed level or more, said print control means interrupting said print operation when said vibration is said prescribed level or more;
   wherein said photosensitive recording medium is in a stationary state when said visible image is recorded.

12. An electronic still camera according to claim 11, wherein said print head records one line of said visible image on said photosensitive recording medium in a second direction perpendicular to said first direction, and said print head is moved in said first direction whenever said one line is recorded.

13. An electronic still camera according to claim 12, wherein said vibration detector is disposed inside said electronic still camera.

14. An electronic still camera according to claim 13, wherein said photosensitive recording medium is an instant film.

15. An electronic still camera according to claim 14, further comprising:
   an image sensor for taking a subject; and
   a memory for storing a signal of said image sensor,
   wherein image data read from said memory is supplied to said optical printer upon instruction of printing.

16. An optical printer according to claim 11, wherein said vibration detector detects the vibration applied in said first direction.

17. An optical printer according to claim 11, wherein said vibration detector detects acceleration of said print head.

18. An optical printer having a built-in optical printer including a print head which is moved on a parallel with an image forming surface of a photosensitive recording medium and is moved in a first direction, a print operation being performed by emitting a printing light from said print head toward said photosensitive recording medium, said optical printer comprising:
   a vibration detector for detecting vibration applied to said optical printer; and
   print control means for judging, based on a signal outputted from said vibration detector, whether or not said vibration is a prescribed level or more, said print control means interrupting said print operation when said vibration is said prescribed level or more;
   wherein said print control means suspends to interrupt said print operation until said print operation of said one line is completed.

* * * * *